United States Patent
Fujita

(10) Patent No.: US 11,863,721 B2
(45) Date of Patent: Jan. 2, 2024

(54) IMAGE FORMING APPARATUS FOR SUPPLYING POWER TO A FIRST CONTROLLER BASED ON DETECTION OF AN ABNORMALITY IN A SECOND CONTROLLER

(71) Applicant: Hayato Fujita, Kanagawa (JP)

(72) Inventor: Hayato Fujita, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 201 days.

(21) Appl. No.: 17/577,183

(22) Filed: Jan. 17, 2022

(65) Prior Publication Data

US 2022/0232140 A1 Jul. 21, 2022

(30) Foreign Application Priority Data

Jan. 21, 2021 (JP) .................................. 2021-007764

(51) Int. Cl.
*H04N 1/00* (2006.01)

(52) U.S. Cl.
CPC ..... *H04N 1/00896* (2013.01); *H04N 1/00037* (2013.01); *H04N 1/00082* (2013.01)

(58) Field of Classification Search
None
See application file for complete search history.

(56) References Cited

U.S. PATENT DOCUMENTS

| | | | |
|---|---|---|---|
| 2011/0282512 A1* | 11/2011 | Shimizu | G06F 3/1234 700/297 |
| 2013/0243459 A1 | 9/2013 | Omori et al. | |
| 2013/0302052 A1 | 11/2013 | Iwata et al. | |
| 2014/0139605 A1 | 5/2014 | Fujita et al. | |
| 2014/0333940 A1 | 11/2014 | Iwata et al. | |
| 2015/0180200 A1 | 6/2015 | Fujita et al. | |
| 2015/0199000 A1 | 7/2015 | Kawaura | |
| 2015/0251442 A1 | 9/2015 | Ishida et al. | |
| 2015/0324671 A1 | 11/2015 | Iwata et al. | |
| 2016/0234399 A1 | 8/2016 | Omori et al. | |
| 2016/0247050 A1 | 8/2016 | Fujita et al. | |
| 2017/0286814 A1 | 10/2017 | Fujita et al. | |
| 2017/0343920 A1 | 11/2017 | Miyadera et al. | |
| 2018/0176414 A1 | 6/2018 | Iwata et al. | |

FOREIGN PATENT DOCUMENTS

| | | |
|---|---|---|
| JP | 2000-232540 | 8/2000 |
| JP | 2007-286859 | 11/2007 |
| JP | 2015-135556 | 7/2015 |

* cited by examiner

*Primary Examiner* — Eric A. Rust
(74) *Attorney, Agent, or Firm* — Duft & Bornsen, PC

(57) ABSTRACT

A control device includes a first control unit, including a first controller, to operate in a first operation mode and be powered off in a second operation mode in which a power consumption is lower than in the first operation mode; a second control unit, including a second controller, to operate in the first operation mode and the second operation mode; and a power supply controller to control power supply to the first control unit and the second control unit. The second control unit includes a communication interface to perform communication with the first control unit and stop operating in the second operation mode, an abnormality detector to detect an abnormality of the second controller, and a system controller to cause the communication interface to start an operation and the power supply controller to activate the first control unit, based on detection of the abnormality in the second operation mode.

8 Claims, 7 Drawing Sheets

IMAGE FORMING APPARATUS FOR SUPPLYING POWER TO A FIRST CONTROLLER BASED ON DETECTION OF AN ABNORMALITY IN A SECOND CONTROLLER

CROSS-REFERENCE TO RELATED APPLICATION

This patent application is based on and claims priority pursuant to 35 U.S.C. § 119(a) to Japanese Patent Application Nos. 2021-007764, filed on Jan. 21, 2021, in the Japan Patent Office, the entire disclosure of which is incorporated by reference herein.

BACKGROUND

Technical Field

Embodiments of the present disclosure relate to a control device, an image forming apparatus, and a method of controlling the control device.

Related Art

A method is known in which a watchdog timer monitors whether a central processing unit (CPU) is operating normally, and when the watchdog timer times out, the power of the entire system is turned on again. In addition, a method is known in which power is forcibly supplied to a main control unit when a watchdog timer in a sub control unit times out during an energy-saving mode in which power supply to the main control unit that controls the entire apparatus is stopped.

Further, a method is known in which, when a watchdog timer in an input-and-output (I/O) controller times out during an energy-saving mode, a main control unit is restarted and a predetermined circuit other than a communication unit in the I/O controller are reset. Furthermore, a method is known of restarting a sub control unit and returning a main control unit from a power saving state when a watchdog timer in the sub control unit times out during a power saving mode.

SUMMARY

According to an embodiment of the present disclosure, there is provided a control device that includes a first control unit, a second control unit, and a power supply controller. The first control unit includes a first controller, and operates in a first operation mode and is powered off in a second operation mode in which a power consumption is lower than a power consumption in the first operation mode. The second control unit includes a second controller and operates in the first operation mode and the second operation mode. The power supply controller controls power supply to the first control unit and power supply to the second control unit. The second control unit includes a communication interface, an abnormality detector t, and a system controller. The communication interface performs communication with the first control unit and stops operating in the second operation mode. The abnormality detector detects an abnormality of the second controller. The system controller causes the communication interface to start an operation and causes the power supply controller to activate the first control unit, based on detection of the abnormality of the second controller by the abnormality detector in the second operation mode.

According to another embodiment of the present disclosure, there is provided an image forming apparatus that includes the control device and an image forming device configured to form an image under control of the first control unit during the first operation mode.

According to still another embodiment of the present disclosure, there is provided a method of controlling a control device that includes a first control unit, a second control unit, and a power supply controller. The method includes: operating the first control unit including a first controller in a first operation mode; powering off the first control unit in a second operation mode in which a power consumption is lower than a power consumption in the first operation mode; operating the second control unit including a second controller in the first operation mode and in the second operation mode; controlling power supply to the first control unit and power supply to the second control unit by the power supply controller; performing communication between the first control unit and the second control unit through a communication interface of the second control unit; and stopping an operation of the communication interface in the second operation mode. The method includes, in response to detection of an abnormality of the second controller in the second operation mode by the second control unit, causing the communication interface to start the operation and causing the power supply controller to activate the first control unit.

According to still another embodiment of the present disclosure, there is provided a non-transitory processor-readable storage medium having instructions stored thereon, which when executed by one or more processors, cause the one or more processors to implement a method of controlling a control device that includes a first control unit, a second control unit, and a power supply controller. The method includes: operating the first control unit including a first controller in a first operation mode; powering off the first control unit in a second operation mode in which a power consumption is lower than a power consumption in the first operation mode; operating the second control unit including a second controller in the first operation mode and in the second operation mode; controlling power supply to the first control unit and power supply to the second control unit by the power supply controller;

performing communication between the first control unit and the second control unit through a communication interface of the second control unit; and stopping an operation of the communication interface in the second operation mode. The method includes, in response to detection of an abnormality of the second controller in the second operation mode by the second control unit, causing the communication interface to start the operation and causing the power supply controller to activate the first control unit.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
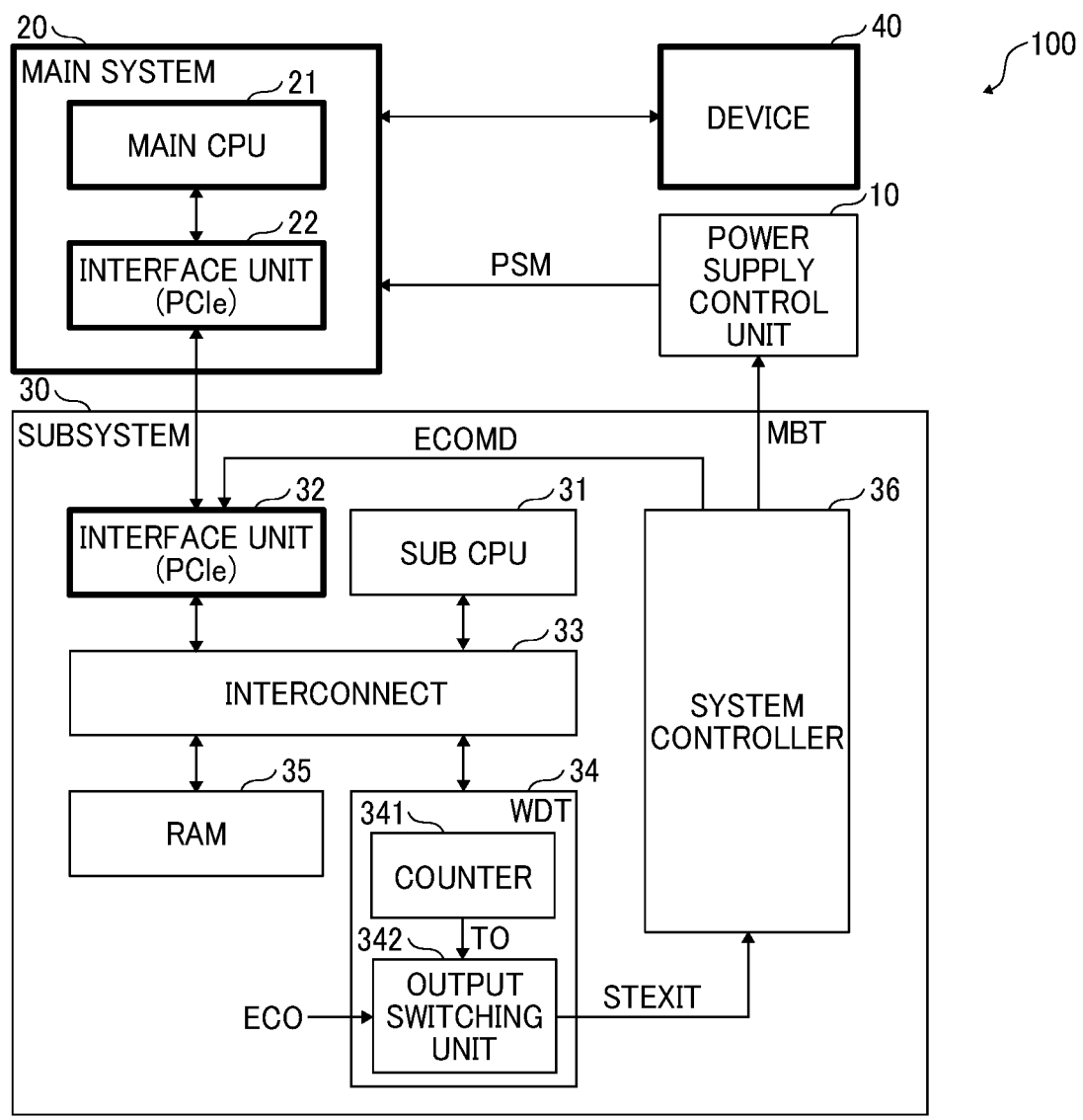
FIG. 1 is a block diagram illustrating a control device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, embodiments will be described with reference to the drawings. In the following description, signal lines through which information such as signals is transmitted are denoted by the same reference numerals as the signal names. In the drawings, the same reference numerals are given to the same components, and redundant explanation may be omitted.

First Embodiment

FIG. 1 is a block diagram illustrating a control device according to a first embodiment of the present disclosure. A control device 100 illustrated in FIG. 1 includes a power supply controller 10, a main system 20, a subsystem 30, and a device 40. The main system 20 is an example of a first control unit, and the subsystem 30 is an example of a second control unit.

The device 40 is, for example, an image forming device that forms an image, a display, or a mechanical device of a robot. In a case where the device 40 functions as an image forming device, the device 40 includes, for example, a scanner that scans an image recorded on a paper medium and forms image data, and a plotter or a printer that forms an image on a paper medium using image data. The device 40 functioning as an image forming device, a display, or a mechanical device of a robot returns from a standby state (energy-saving mode described later) and operates based on, for example, an operation of an operation unit by a user.

Among the elements illustrated in FIG. 1, the elements indicated by thick frames operate in a normal mode, which is one of the operation modes, and stop operating in an energy-saving mode, which is another one of the operation modes. Elements other than those indicated by the thick frames in FIG. 1 operate in the normal mode and the energy-saving mode. The energy-saving mode may also be referred to as power-saving mode. The normal mode is an example of a first operation mode, and the energy-saving mode is an example of a second operation mode.

The main system 20 includes a main central processing unit (CPU) 21 and an interface (I/F) unit 22. During the normal mode, the main CPU 21 operates by receiving supply of a power supply PSM (power supply voltage for main system) from the power supply controller 10. During the normal mode, the main system 20 controls the entire operation of the control device 100 and controls the device 40 to perform the operation of the device 40. The main CPU 21 is an example of a first controller.

The main system 20 stops operating during a period in which the power supply PSM is not supplied from the power supply controller 10 (energy-saving mode). The main CPU 21 operates by executing a control program during the normal mode, and stops operating during the energy-saving mode. The interface unit 22 includes, for example, a peripheral component interconnect express (PCIe) interface. However, in some embodiments, the interface unit 22 may include any other suitable interface such as a serial interface.

The subsystem 30 includes a sub CPU 31, an interface unit 32 (e.g., PCIe interface), an interconnect 33, a watchdog timer (WDT) 34, a RAM 35, and a system controller 36. In the energy-saving mode, the sub CPU 31 controls the entire control device 100 instead of the main CPU 21. The sub CPU 31 constantly operates regardless of the operation mode. The sub CPU 31 is an example of a second controller, and the interface unit 32 is an example of a communication interface unit.

Note that since the main CPU 21 controls the operation of the device 40 and performs processing with a large load, the circuit scale is large and power consumption is large. On the other hand, since the sub CPU 31 does not perform processing associated with the operation of the device 40 or the like, the circuit scale can be reduced and power consumption can be reduced compared to the main CPU 21. Therefore, the power consumption of the control device 100 in the energy-saving mode in which the device 40 does not operate can be further reduced as compared with that in the normal mode. The main CPU 21 and the sub CPU 31 may be processors other than CPUs or controllers.

The interface unit 32 includes a physical interface unit (PHY) including an analog circuit. The physical interface unit has a power-down mode. In the normal mode, the interface unit 32 performs communication with the interface unit 22 of the main system 20 using packets (PCIe packets). During the energy-saving mode, the interface unit 32 stops its operation in response to assertion of an energy-saving mode signal ECOMD from the system controller 36. At this time, the physical interface unit is set to the power-down mode.

Thus, the operation of the circuit in the subsystem 30 connected to the main system is stopped during the energy-saving mode in which the operation of the main system 20 is stopped, thus allowing further reduction of the power consumption of the control device 100 during the energy-saving mode. When the interface unit 22 has a serial interface, the interface unit 32 has a serial interface corresponding to the interface unit 22.

The interconnect 33 has an internal bus that interconnects internal circuits such as the sub CPU 31, the interface unit 32, the WDT 34, and the RAM 35. For example, the sub CPU 31 inputs and outputs information to and from the interface unit 32 via the interconnect 33, reads and writes information from and to the RAM 35, and sets, for example, a count value of the WDT 34.

The WDT 34 includes a counter 341 and an output switching unit 342. The counter 341 updates the count value in synchronization with the clock signal and resets the count value by a reset signal output from the sub CPU 31. The counter 341 outputs a time-out signal TO to the output switching unit 342 when the counter 341 counts up to a preset count value before receiving the reset signal from the sub CPU 31. The WDT 34 is an example of an abnormality detector that detects an abnormality in the sub CPU 31.

When the output switching unit 342 receives the time-out signal TO while an energy-saving mode determination signal ECO indicates the energy-saving mode, the output switching unit 342 asserts a stall release signal STEXIT. When the output switching unit 342 receives the time-out signal TO while the energy-saving mode determination signal ECO indicates the normal mode, the output switching unit 342 maintains a negation level of the stall release signal STEXIT. For example, the energy-saving mode determination signal ECO is maintained at a high level during the energy-saving mode and maintained at a low level during the normal mode.

The RAM 35 holds, for example, work data used in the sub CPU 31 and an operation history of each circuit in the subsystem 30. The RAM 35 may hold programs to be executed by the sub CPU 31.

The system controller 36 controls the entire subsystem 30. During the energy-saving mode, the system controller 36 maintains a main boot signal MBT at the negation level, and maintains the energy-saving mode signal ECOMD at the assertion level. During the energy-saving mode, the system controller 36 asserts the main boot signal MBT and negates the energy-saving mode signal ECOMD in response to the assertion of the stall release signal STEXIT. Then, the system controller 36 returns the main CPU 21 and the interface unit 32 from the energy-saving mode to the normal mode. The system controller 36 is an example of a system control unit.

During negation of the main boot signal MBT, the power supply controller 10 stops supply of the power supply PSM to the main system 20, and sets the main system 20 to the energy-saving mode. In response to the assertion of the main boot signal MBT, the power supply controller 10 supplies the power supply PSM to the main system 20 to activate the main system 20.

Figure 2:
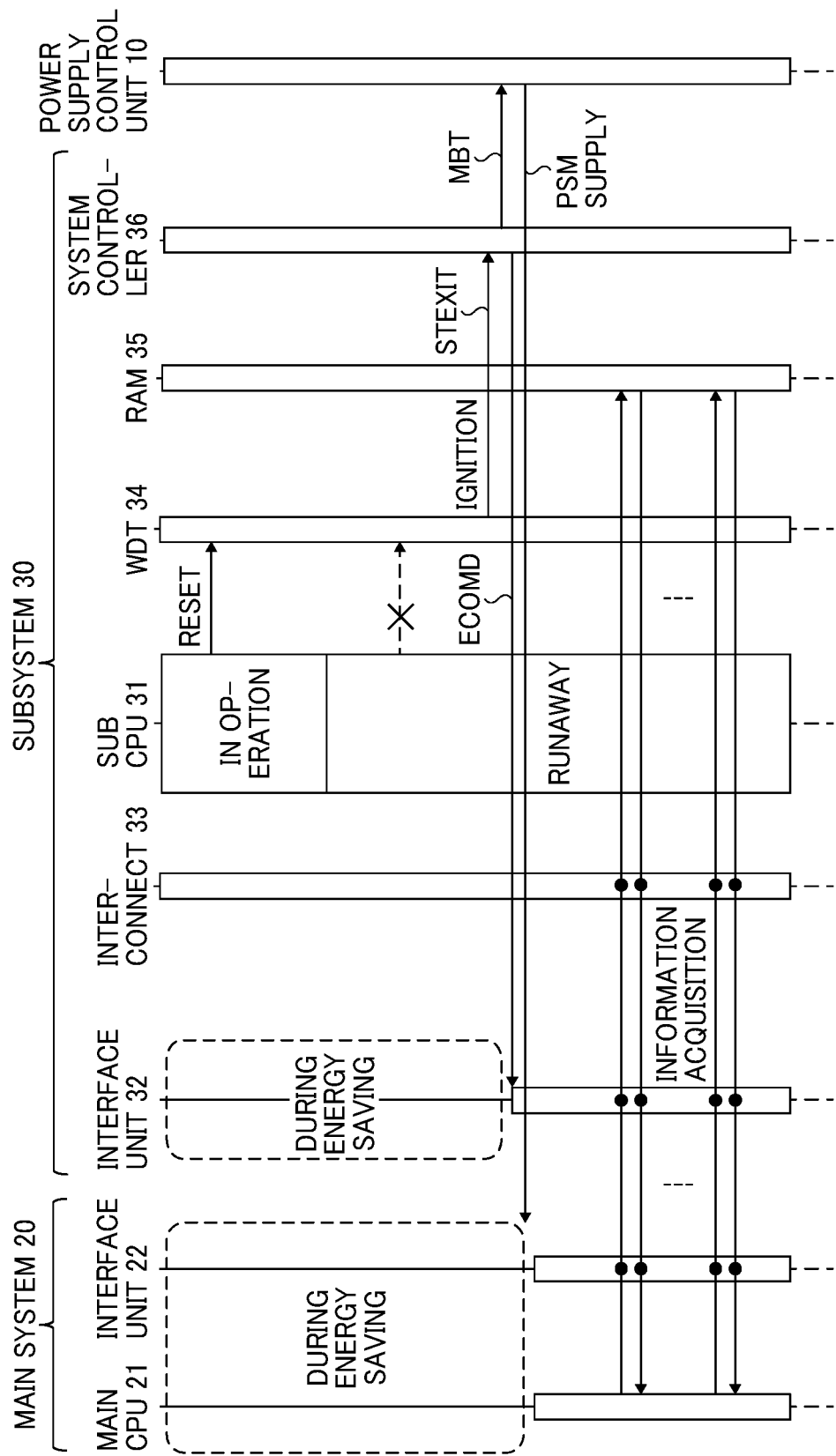
FIG. 2 is a sequence diagram illustrating an example of an operation of the control device of FIG. 1.

FIG. 2 is a sequence diagram illustrating an example of an operation of the control device 100 of FIG. 1. That is, FIG. 2 illustrates an example of a method of controlling the control device 100. In FIG. 2, a vertically long rectangle indicates that each circuit is in operation. A black circle in the rectangle indicates that information such as a signal is relayed. In the initial state of FIG. 2, the main system 20 and the interface unit 32 of the subsystem 30 stop operating in the energy-saving mode (during energy saving).

For example, in the energy-saving mode, the interface unit 32 is in a reset state in response to the reset signal of the assertion level, and the supply of the clock signal is stopped. Further, the physical interface unit (PHY) of the interface unit 32 is set to the power down mode. During the energy-saving mode, the device 40 also stops operating.

The sub CPU 31 periodically resets the WDT 34, and the WDT 34 avoids time-outs by resetting. If the sub CPU 31 runs away for some reason, the WDT 34 is not reset by the sub CPU 31. Consequently, a time-out occurs in the WDT 34 (ignition). The time-out WDT 34 outputs the stall release signal STEXT to the system controller 36.

In response to the stall release signal STEXIT, the system controller 36 outputs the main boot signal MBT to the power supply controller 10 (from the negation level to the assertion level). In response to the stall release signal STEXIT, the system controller 36 also sets the energy-saving mode signal ECOMD output to the interface unit 32 from the assertion level to the negation level.

In response to the negation of the energy-saving mode signal ECOMD, the interface unit 32 is released from the reset state and thus the clock signal starts to be supplied. As a result, the interface unit 32 can be activated by the energy-saving mode signal ECOMD, and communication with the main system 20 can be enabled. Then, the operation mode of the subsystem 30 transitions from the energy-saving mode to the normal mode.

The power supply controller 10 supplies the power supply PSM to the main system in response to the main boot signal MBT. The main system 20 is activated by the supply of the power supply PSM, and the main CPU 21 and the interface unit 22 start operating. As a result, the operation mode of the main system 20 transitions from the energy-saving mode to the normal mode.

When the main system 20 is activated and the interface unit 32 of the subsystem 30 starts operating, the main CPU 21 can access the RAM 35. Then, the main CPU 21 accesses the RAM 35 for reading via the interface units 22 and 32 and the interconnect 33, and reads, for example, operation history information of the subsystem 30 from the RAM 35. This allows the history information to be used to investigate the cause of a failure of the subsystem 30. The control device 100 is then restarted and resumes operation.

Conventionally, for example, in a case where a communication interface unit in a sub control unit that communicates with a main control unit stops operating during an energy-saving mode, the main control unit cannot access a memory or the like in the sub control unit only by restarting the main control unit when a watchdog timer times out. For this reason, the main control unit cannot acquire the information held in the memory when the watchdog timer times out. In addition, when the sub-control unit includes an interconnect that connects circuits in the sub-control unit to each other, the interconnect might be in an abnormal state due to runaway of a sub-controller in the sub-control unit. When the interconnect is in the abnormal state, the main control unit cannot access the memory or the like in the sub-control unit and cannot acquire information held in the memory.

As described above, in the first embodiment, the system controller 36 activates the main system 20 and causes the interface unit 32 to start operating based on the stall release signals STEXIT output by the sub CPU 31 when the WDT 34 runs away during the energy-saving mode. As a result, the main CPU 21 can read operation history information of the subsystem 30 from the RAM 35 via the interface unit 22, the interface unit 32, and the interconnect 33. Therefore, the history information read during the runaway of the sub CPU 31 can be used to investigate the cause of the failure of the subsystem 30.

The reset state of the interface unit 32 is released in response to the energy-saving mode signal ECOMD and the supply of the clock signal to the interface unit 32 is started, thus allowing the subsystem 30 to communicate with the main system 20.

Second Embodiment

Figure 3:
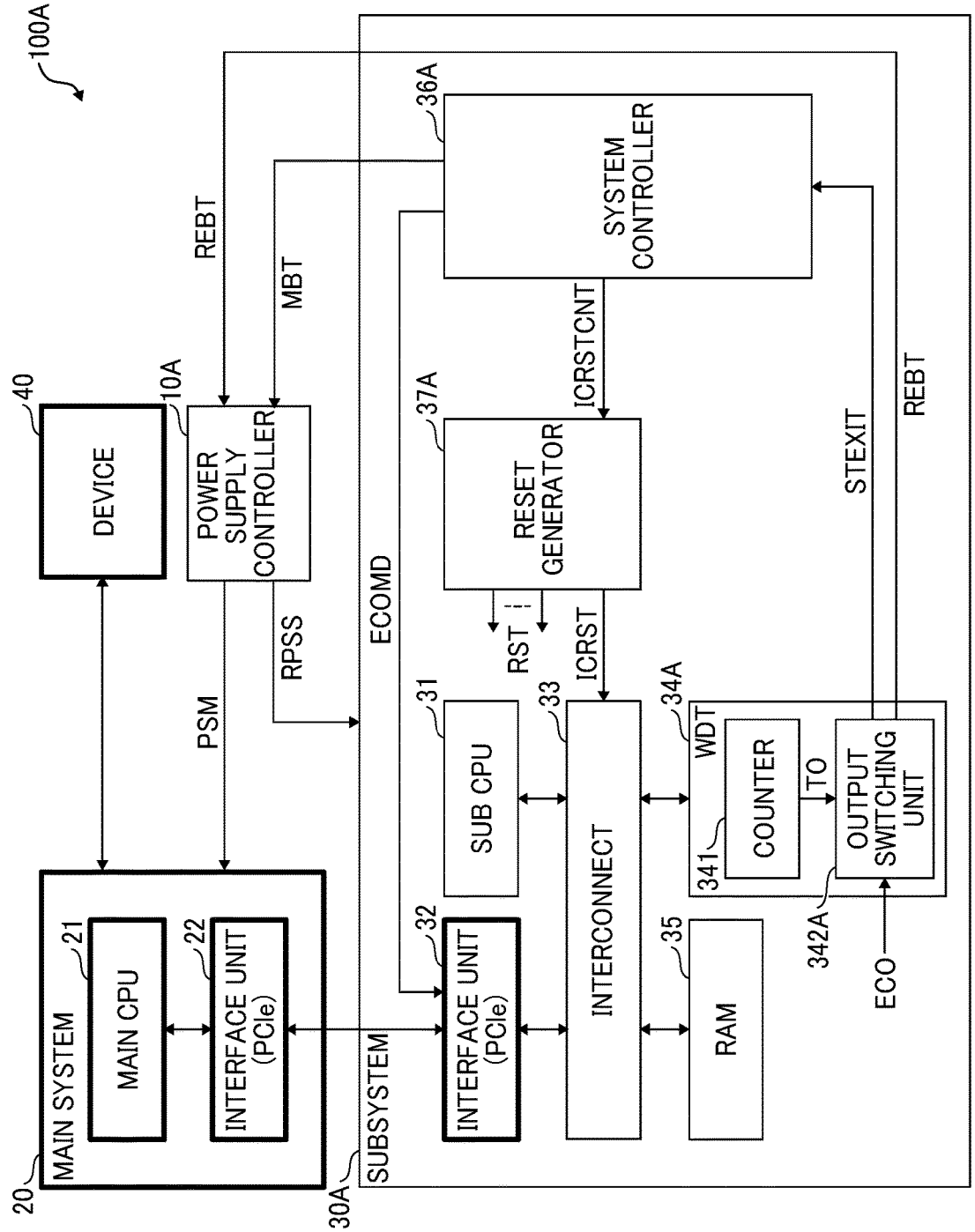
FIG. 3 is a block diagram illustrating a control device according to a second embodiment of the present disclosure.

FIG. 3 is a block diagram illustrating a control device according to a second embodiment of the present disclosure. Elements similar to those illustrated in FIG. 1 are denoted by the same reference numerals, and detailed description thereof will be omitted. A control device 100A illustrated in FIG. 3 includes a power supply controller 10A and a subsystem 30A instead of the power supply controller 10 and the subsystem 30 illustrated in FIG. 1. Other configurations of the control device 100A are the same as those in FIG. 1.

The subsystem 30A has a WDT 34 and a system controller 36A instead of the WDT 34A and the system controller 36 of the subsystem 30 illustrated in FIG. 1. In the subsystem 30A, a reset generator 37A is added to the subsystem 30 of FIG. 1. Other configurations of the subsystem 30A are similar to those of the subsystem 30 illustrated in FIG. 1.

The WDT 34A is similar to the WDT 34 of FIG. 1 except that the WDT 34A has an output switching unit 342A instead of the output switching unit 342 of FIG. 1. When the output switching unit 342A receives the time-out signal TO while the energy-saving mode determination signal ECO indicates the energy-saving mode, the output switching unit 342A asserts the stall release signal STEXIT and maintains a reboot signal REBT at the negation level. The reboot signal REBT is output to the power supply controller 10A. When the output switching unit 342 receives the time-out signal TO while the energy-saving mode determination signal ECO indicates the normal mode, the output switching unit 342 maintains the stall release signal STEXIT at the negation level and asserts the reboot signal REBT.

The system controller 36A is similar in function to the system controller 36 of FIG. 1, except that system controller 36A asserts an interconnect reset control signal ICRSTCNT in response to assertion of the stall exit signal STEXIT during the energy-saving mode.

The reset generator 37A has a function of generating reset signals to be output to a plurality of resettable circuits in the subsystem 30A. The reset generator 37A temporarily sets the interconnect reset signal ICRST to a reset level in response to the assertion of the interconnect reset control signal ICRSTCNT. For example, the reset generator 37A sets the interconnect reset signal ICRST to a low level, which is the reset level, and then returns the interconnect reset signal ICRST to a high level, thereby issuing a reset pulse to the interconnect 33.

The interconnect 33 resets the internal circuit in response to the reset pulse of the interconnect reset signal ICRST to initialize an internal circuit. When the sub CPU 31 runs away, the interconnect 33 may not operate normally, for example, by repeatedly receiving an invalid access request or the like from the sub CPU 31. In this embodiment, the interconnect 33 is reset at the time of runaway of the sub CPU 31, thus allowing the interconnect 33, which may not operate normally, to be returned to normally to a normal state.

In addition to the functions of the power supply controller 10 illustrated in FIG. 1, the power supply controller 10A has a function of re-supplying the power supply PSM to be supplied to the main system 20 and a power supply PSS (power supply voltage for subsystem) to be supplied to the subsystem 30A in response to the assertion of the reboot signal REBT. Here, the re-supply means that the power supply PSM and the power supply PSS are cut off once and then supplied again. For example, each of the main system 20 and the subsystem 30A is restarted by resetting an internal circuit by a built-in power-on reset circuit based on re-supply of the corresponding power supplies PSM and PSS.

Figure 4:
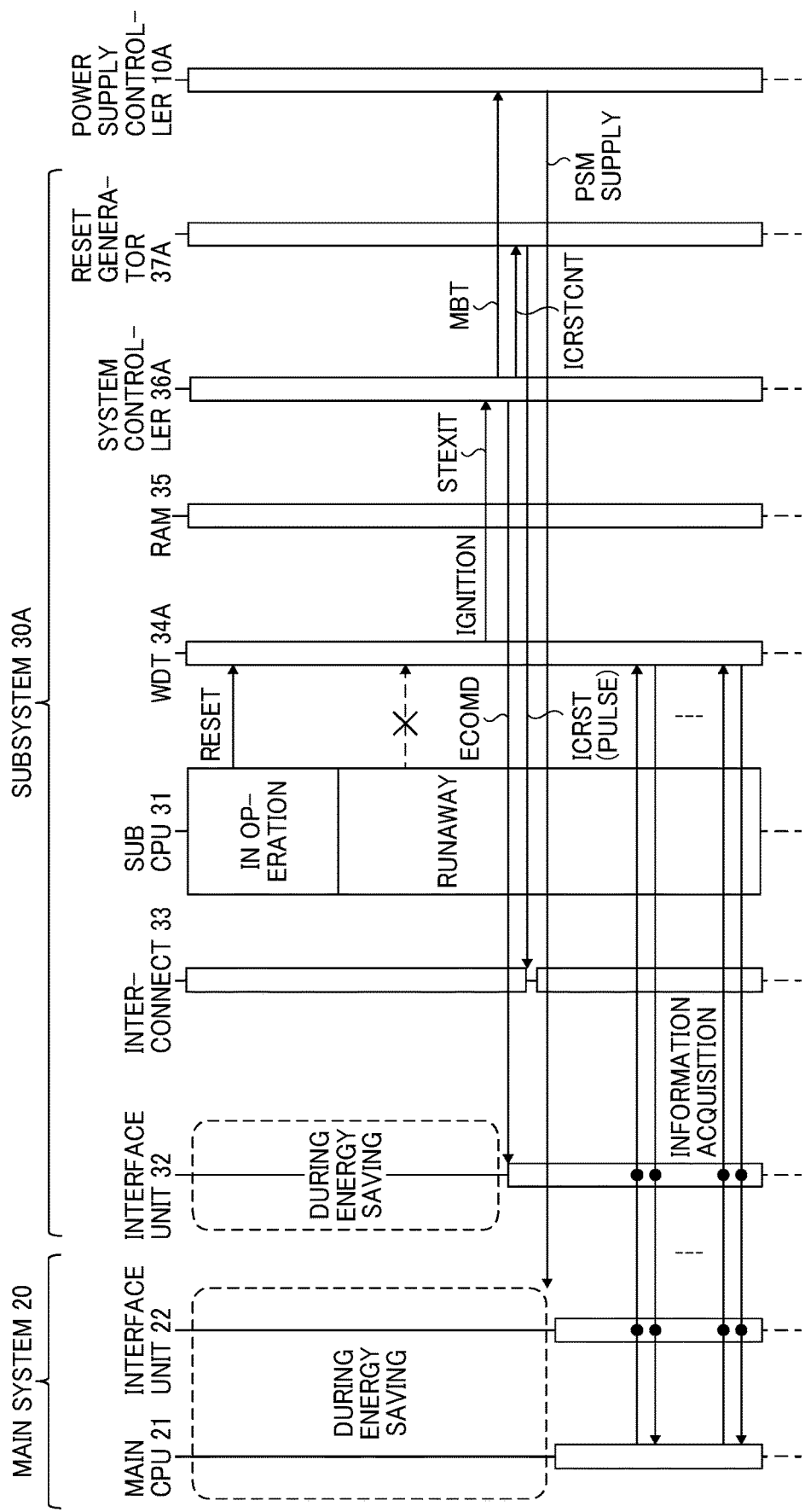
FIG. 4 is a sequence diagram illustrating an example of an operation of the control device of FIG. 3.

FIG. 4 is a sequence diagram illustrating an example of an operation of the control device 100A of FIG. 3. That is, FIG. 4 illustrates an example of a method of controlling the control device 100A. Detailed descriptions of the operations similar to those in FIG. 2 will be omitted.

In FIG. 4, the system controller 36A asserts the main boot signal MBT and the interconnect reset control signal ICRSTCNT and negates the energy-saving mode signal ECOMD in response to the assertion of the stall release signal STEXIT during the energy-saving mode. The assertion of the interconnect reset control signal ICRSTCNT is an example of a release instruction to release the reset of the interconnects 33.

The reset generator 37A temporarily asserts the interconnect reset signal ICRST in response to the assertion of the interconnect reset control signal ICRSTCNT to set the reset state. Then, the reset generator 37A negates the interconnect reset signal ICRST and sets the reset release state. In this manner, the reset generator 37A outputs a reset pulse to the interconnect 33. The interconnect 33 is reset in response to a reset pulse of the interconnect reset signal ICRST and is set to an initial state. Other operations in FIG. 4 are the same as those in FIG. 2.

Figure 5:
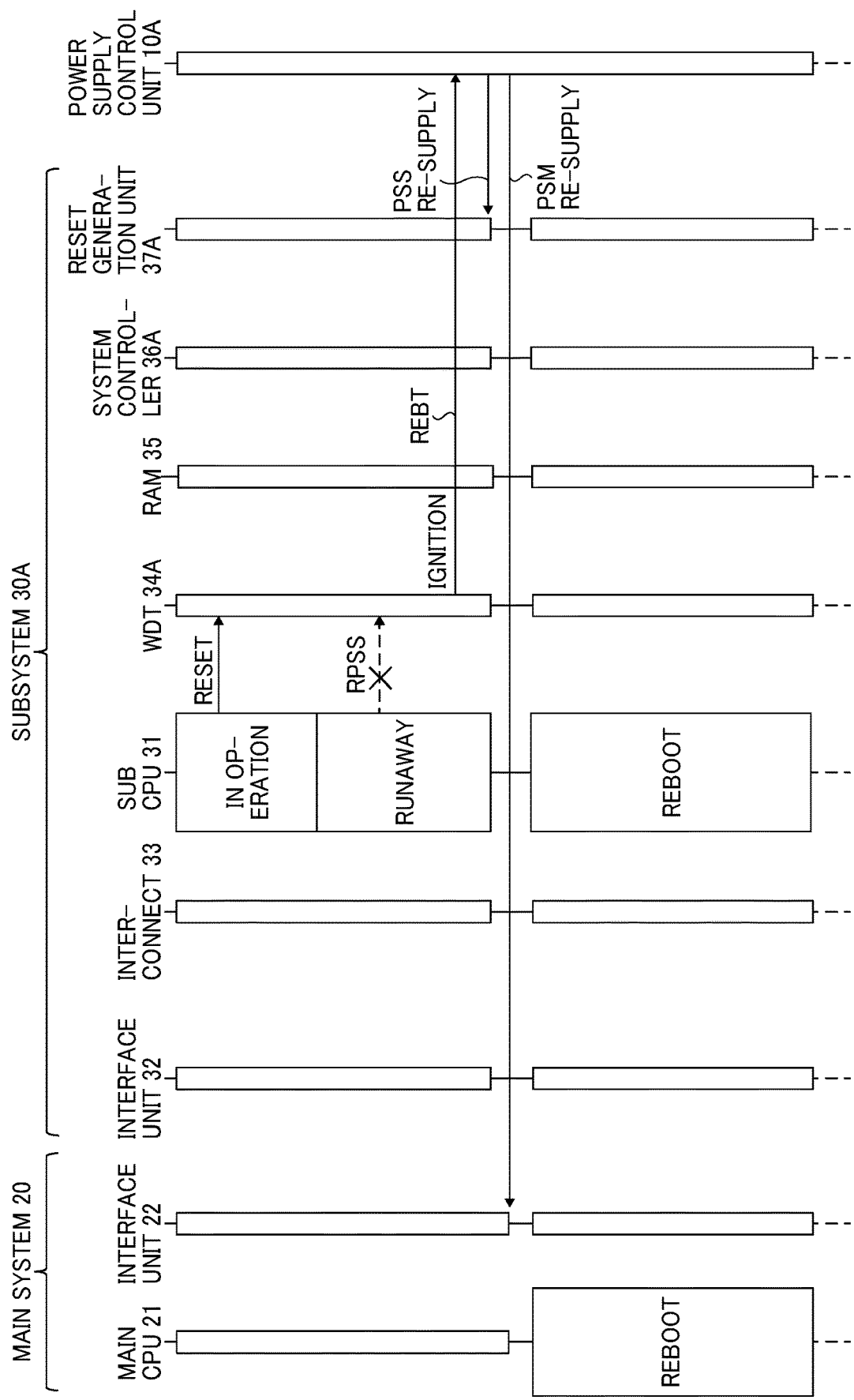
FIG. 5 is a sequence diagram illustrating another example of the operation of the control device of FIG. 3.

FIG. 5 is a sequence diagram illustrating another example of the operation of the control device 100A of FIG. 3. That is, FIG. 5 illustrates an example of the method of controlling the control device 100A. Detailed descriptions of the operations similar to those in FIG. 2 will be omitted. FIG. 5 illustrates the operation during the normal mode. In the initial state of FIG. 5, circuits of the main system 20 and circuits of the subsystem 30A are operating.

Similar to FIG. 2, the sub CPU 31 periodically resets the WDT 34A, and the WDT 34A avoids time-outs by resetting. If the sub CPU 31 runs away for some reason, a timeout occurs in the WDT 34A (ignition). In the normal mode, the energy-saving mode determination signal ECO of FIG. 3 is set to a low level. For this reason, the WDT 34A outputs the reboot signal REBT to the power supply controller 10A in response to the occurrence of the timeout.

In response to the reboot signal REBT, the power supply controller 10A re-supplies the power supply PSM to the main system 20 and re-supplies the power supply PSS to the subsystem 30. As a result, the main CPU 21 and the sub CPU 31 can be restarted and the operations of the main system 20 and the subsystem 30 can be resumed.

As described above, the same effects as those of the first embodiment can be also obtained in the second embodiment. For example, when the sub CPU 31 runs away during the energy-saving mode, the main system 20 can be activated and the interface unit 32 can be started to operate. Thus, the operation history information of the subsystem 30 or the like can be read out from the subsystem 30 to the main system 20 during the runaway of the sub CPU 31, and the cause of the failure of the subsystem 30 can be investigated.

Furthermore, in the second embodiment, the interconnect 33 can be reset at the time of runaway of the sub CPU 31 in the energy-saving mode, thus allowing the interconnect 33, which may not operate normally, to be returned to normally to a normal state.

The WDT 34A of the output switching unit 342A can assert either the stall release signal STEXIT or the reboot signal REBT according to the logic level of the energy-saving mode determination signal ECO when the timeout signal TO is generated. Thus, when the sub CPU 31 runs away, the control device 100A can be optimally restored in accordance with the energy-saving mode or the normal mode.

Third Embodiment

Figure 6:
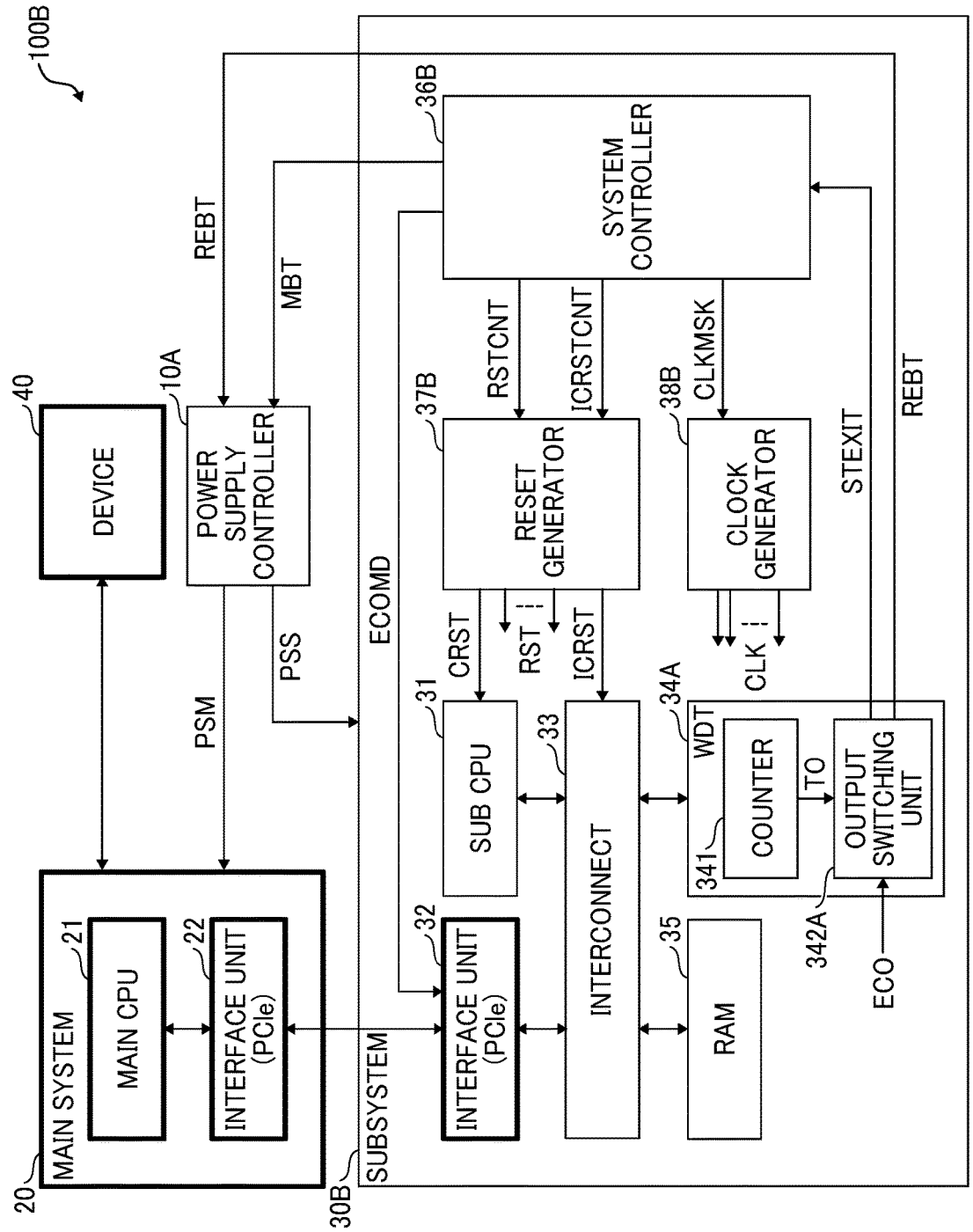
FIG. 6 is a block diagram illustrating an example of a control device according to a third embodiment of the present disclosure.

FIG. 6 is a block diagram illustrating an example of a control device according to the third embodiment of the present disclosure. Elements similar to those in FIGS. 1 and 3 are denoted by the same reference numerals, and detailed description thereof is omitted. A control device 100B illustrated in FIG. 6 has a subsystem 30B instead of the subsystem 30A of FIG. 3. Other configurations of the control device 100B are the same as those in FIG. 3.

The subsystem 30B has a system controller 36B and a reset generator 37B instead of the system controller 36A and the reset generator 37A of FIG. 3. In the subsystem 30B, a clock generator 38B is added to the subsystem 30A of FIG. 3. Other configurations of the subsystem 30B are the same as those of the subsystem 30A of FIG. 3.

The system controller 36B sets the interconnect reset control signal ICRSTCNT and the reset control signal RSTCNT from the negation level to the assertion level in response to assertion of the stall release signal STEXT. In response to assertion of the stall release signal STEXT, the system controller 36B sets the clock mask signal CLKMSK from the assertion level to the negation level. The assertion of the reset control signal RSTCNT is an example of a stop instruction to stop the operation of the sub CPU 31.

The reset generator 37B temporarily asserts the interconnect reset signal ICRST in response to the assertion of the interconnect reset control signal ICRSTCNT. In response to the assertion of the reset control signal RSTCNT, the reset generator 37B sets a CPU reset signal CRST from the negation level to the assertion level (reset state of the sub CPU 31), and maintains the set assertion level.

Further, in response to the assertion of the reset control signal RSTCNT, the reset generator 37B sets the reset signal RST supplied to each predetermined circuit from the assertion level to the negation level. Here, the predetermined circuit is a circuit to be set to a reset state during the energy-saving mode. The reset state of a predetermined circuit is released by negation of the corresponding reset signal RST, thus causing the predetermined circuit to be operable. When the WDT 34A times out in the energy-saving mode, the operation of the predetermined circuit is resumed. Thus, the main CPU 21 activated by the timeout can access each circuit in the subsystem 30B.

In the energy-saving mode, during negation of the reset control signal RSTCNT, the reset generator 37B asserts each of the reset signals RST to be supplied to the predetermined circuits to stop the operation of the corresponding one of the predetermined circuits. The operation of a predetermined circuit in the subsystem 30B that does not need to operate during the energy-saving mode is stopped, thus allowing reduction of the power consumption of the subsystem 30B during the energy-saving mode.

The sub CPU 31 operates during negation of the CPU reset signal CRST. The sub CPU 31 is reset by the assertion of the CPU reset signal CRST, and maintains the reset state during the assertion of the CPU reset signal CRST. As a result, when the WDT 34 times out in the energy-saving mode, the operation of the sub CPU 31 that is running away can be stopped, thus preventing malfunction of the RAM 35 such as erroneous rewriting of the sub CPU 31.

The clock generator 38B has a function of generating clock signals CLK to be output to clock synchronization circuits in the subsystem 30B. In the energy-saving mode, the clock generator 38B stops supplying the clock signals CLK to the predetermined circuits during assertion of the clock mask signals CLKMSK. As a result, during the energy-saving mode, charging and discharging of the predetermined circuits by the clock signals CLK can be reduced, and the power consumption of the subsystem 30B can be further reduced.

In the energy-saving mode, the clock generator 38B resumes supply of the clock signals CLK to the predetermined circuits in response to negation of the clock mask signals CLKMSK. As a result, the main CPU 21 activated by timeout can access each circuit in the subsystem 30B.

Figure 7:
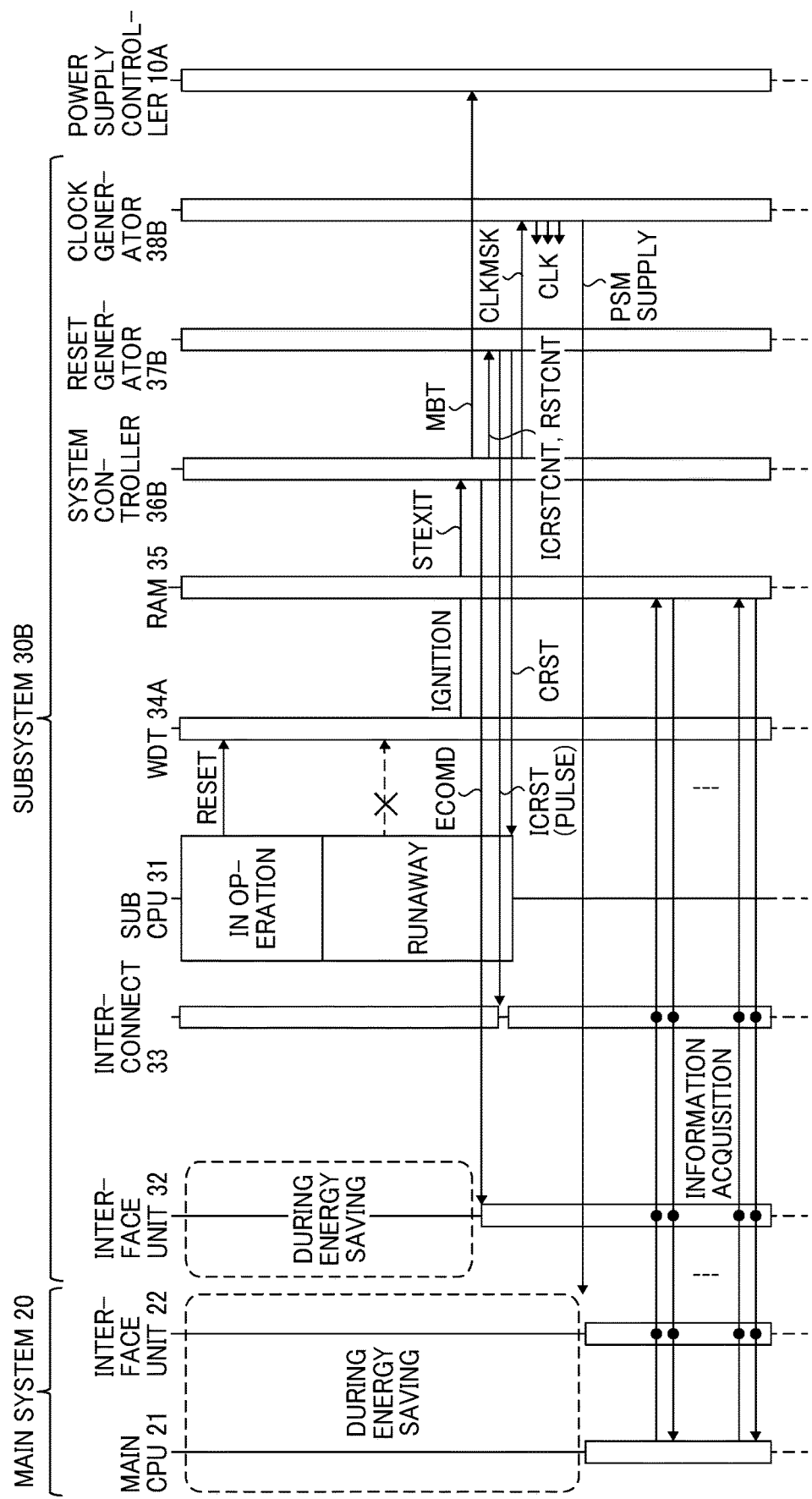
FIG. 7 is a sequence diagram illustrating an example of an operation of the control device of FIG. 6.

FIG. 7 is a sequence diagram illustrating an example of an operation of the control device 100B of FIG. 6. That is, FIG. 7 illustrates an example of a method of controlling the control device 100B. Detailed description of operations similar to those in FIGS. 2 and 4 are omitted.

In FIG. 7, the system controller 36B asserts the main boot signal MBT, the interconnect reset control signal ICRSTCNT, and the reset control signal RSTCNT in response to assertion of the stall release signal STEXIT during the energy-saving mode. The system controller 36B also negates the energy-saving mode signal ECOMD and the clock mask signal CLKMSK.

In response to the assertion of the reset control signal RSTCNT, the reset generator 37B sets the CPU reset signal CRST at the negation level to the assertion level and stops the operation of the sub CPU 31. In this manner, the operation of the sub CPU 31 during the runaway is stopped, thus preventing, for example, a problem such as data loss in the RAM 35 due to continuation of the runaway.

Further, in response to the assertion of the reset control signal RSTCNT, the reset generator 37B sets a reset signal RST supplied to each predetermined circuit to a negation level. In response to negation of the clock mask signals CLKMSK, the clock generator 38B resumes supply of the clock signal CLK to each of the predetermined circuits. When the reset signal RST is negated and the supply of the clock signal CLK is resumed, a predetermined circuit starts operating.

As described above, the same effects as those of the first embodiment and the second embodiment can be also obtained in the third embodiment. Furthermore, in the third embodiment, when the WDT 34A times out in the energy-saving mode, the CPU reset signal CRST generated by the reset generator 37B can stop the operation of the sub CPU 31 that is running away. As a result, malfunction of the sub RAM 35, such as erroneous rewriting of the sub CPU 31, can be prevented.

When the sub CPU 31 runs away in the energy-saving mode, the clock generator 38B can restart the supply of the clock signals CLK to the predetermined circuits in response to the negation of the clock mask signals CLKMSK. As a result, the WDT 34A activated by the timeout of the main CPU 21 can access each circuit in the subsystem 30B.

During the negation of the reset control signal RSTCNT in the energy-saving mode, the reset generator 37B can assert the reset signal RST supplied to each of the predetermined circuits to stop the operation of the predetermined circuits. The operation of a predetermined circuit in the subsystem 30B that does not need to operate during the energy-saving mode can be stopped, thus allowing further reduction of the power consumption of the subsystem 30B during the energy-saving mode.

Although the present disclosure has been described based on the above-described embodiments, embodiments of the present disclosure are not limited to the content illustrated in the above-described embodiments. These points can be modified without departing from the gist of the present disclosure, and can be appropriately determined according to the application form.

The functions of the above-described embodiments may be implemented by one or a plurality of processing circuits. Here, the processing circuit or circuitry in the present specification includes a programmed processor to execute each function by software, such as a processor implemented by an electronic circuit, and devices, such as an application specific integrated circuit (ASIC), a digital signal processor (DSP), and a field programmable gate array (FPGA), and conventional circuit modules arranged to perform the recited functions.

The invention claimed is:

1. A control device, comprising:
a first control unit including a first controller, the first control unit being configured to operate in a first operation mode and to be powered off in a second operation mode in which a power consumption is lower than a power consumption in the first operation mode;
a second control unit including a second controller and being configured to operate in the first operation mode and the second operation mode; and
a power supply controller configured to control power supply to the first control unit and power supply to the second control unit,
the second control unit including:
 a communication interface configured to perform communication with the first control unit and stop operating in the second operation mode;
 an abnormality detector configured to detect an abnormality of the second controller; and
 a system controller configured to cause the communication interface to start an operation and cause the power supply controller to activate the first control unit, based on detection of the abnormality of the second controller by the abnormality detector in the second operation mode.

2. The control device according to claim 1,
wherein the second control unit includes:
 an interconnect interconnecting the second controller, the communication interface, the abnormality detector, and the system controller; and
 a reset generator configured to generate a reset signal to be output to each of a plurality of resettable circuits in the second controller,
wherein the system controller is configured to issue a release instruction for releasing a reset of the interconnect to the reset generator based on the detection of the abnormality by the abnormality detector, and
wherein the reset generator is configured to temporarily set a reset signal to be output to the interconnect to a reset state and then sets the reset signal to a reset release state based on the release instruction.

3. The control device according to claim 2,
wherein the system controller is configured to issue a stop instruction to stop an operation of the second controller to the reset generator based on the detection of the abnormality by the abnormality detector, and
wherein the reset generator sets the reset signal output to the second controller to a reset state based on the stop instruction.

4. The control device according to claim 2,
wherein the second control unit includes a clock generator configured to generate a clock signal to be output to each of clock synchronization circuits in the second control unit, and
wherein the system controller is configured to instruct the reset generator to release a reset state of the communication interface and instruct the clock generator to supply the clock signal to the communication interface based on the detection of the abnormality by the abnormality detector.

5. The control device according to claim 1,
wherein the abnormality detector is configured to output a reboot signal to the power supply controller in response to detection of an abnormality of the second controller in the first operation mode, and
wherein the power supply controller is configured to restart the first control unit and the second control unit based on the reboot signal.

6. An image forming apparatus, comprising:
the control device according to claim 1; and
an image forming device configured to form an image under control of the first control unit during the first operation mode.

7. A method of controlling a control device that includes a first control unit, a second control unit, and a power supply controller, the method comprising:
operating the first control unit including a first controller in a first operation mode;
powering off the first control unit in a second operation mode in which a power consumption is lower than a power consumption in the first operation mode;
operating the second control unit including a second controller in the first operation mode and in the second operation mode;
controlling power supply to the first control unit and power supply to the second control unit by the power supply controller;
performing communication between the first control unit and the second control unit through a communication interface of the second control unit;
stopping an operation of the communication interface in the second operation mode; and
in response to detection of an abnormality of the second controller in the second operation mode by the second control unit,
causing the communication interface to start the operation and
causing the power supply controller to activate the first control unit.

8. A non-transitory processor-readable storage medium having instructions stored thereon, which when executed by one or more processors, cause the one or more processors to implement a method of controlling a control device that includes a first control unit, a second control unit, and a power supply controller, the method comprising:
operating the first control unit including a first controller in a first operation mode;
powering off the first control unit in a second operation mode in which a power consumption is lower than a power consumption in the first operation mode;
operating the second control unit including a second controller in the first operation mode and in the second operation mode;

controlling power supply to the first control unit and power supply to the second control unit by the power supply controller;

performing communication between the first control unit and the second control unit through a communication interface of the second control unit;

stopping an operation of the communication interface in the second operation mode; and in response to detection of an abnormality of the second controller in the second operation mode by the second control unit, causing the communication interface to start the operation and causing the power supply controller to activate the first control unit.

* * * * *